United States Patent
Kuboki et al.

(10) Patent No.: US 11,549,759 B2
(45) Date of Patent: Jan. 10, 2023

(54) HEAT TRANSFER DEVICE AND ENERGY STORAGE MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hideyuki Kuboki, Mie (JP); Hiroki Hirai, Mie (JP); Makoto Higashikozono, Mie (JP); Hiroomi Hiramitsu, Mie (JP); Akihisa Hosoe, Osaka (JP); Yoshiyuki Hirose, Osaka (JP); Akihiro Nagafuchi, Osaka (JP); Tomoharu Takeyama, Osaka (JP); Eiichi Kobayashi, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 164 days.

(21) Appl. No.: 16/767,361

(22) PCT Filed: Nov. 16, 2018

(86) PCT No.: PCT/JP2018/042438
§ 371 (c)(1),
(2) Date: May 27, 2020

(87) PCT Pub. No.: WO2019/107184
PCT Pub. Date: Jun. 6, 2019

(65) Prior Publication Data
US 2020/0386487 A1    Dec. 10, 2020

(30) Foreign Application Priority Data

Dec. 1, 2017    (JP) .............................. JP2017-231505

(51) Int. Cl.
*F28D 15/02*    (2006.01)
*H01M 10/613*    (2014.01)
(Continued)

(52) U.S. Cl.
CPC ............ *F28D 15/02* (2013.01); *H01G 11/10* (2013.01); *H01M 10/613* (2015.04);
(Continued)

(58) Field of Classification Search
CPC ... F28D 15/02; H01M 10/613; H01M 10/625; H01M 10/6552; H01M 10/6569; H01M 50/20; H01G 11/10
(Continued)

(56) References Cited

U.S. PATENT DOCUMENTS 5,642,775 A  *  7/1997  Akachi ............... F28D 15/0233
                                                165/104.19
6,293,333 B1 *  9/2001  Ponnappan ......... F28D 15/0233
                                                29/890.032
(Continued)

FOREIGN PATENT DOCUMENTS

JP          63-148093          6/1988
JP          10-38484           2/1998
(Continued)

OTHER PUBLICATIONS

International Search Report issued in International Patent Application No. PCT/JP2018/042438, dated Feb. 5, 2019.
(Continued)

*Primary Examiner* — Tho V Duong
*Assistant Examiner* — Raheena R Malik
(74) *Attorney, Agent, or Firm* — Greenblum & Bernstein, P.L.C.

(57) ABSTRACT

A heat transfer device includes a bag and a working fluid. The bag includes a first sheet and a second sheet with edges that are sealed together. The working fluid is enclosed in the bag. The working fluid changes a phase thereof between gas and liquid. The bag includes a vaporizing portion in which the liquid-phase working fluid is vaporized and a condensing portion in which the gas-phase working fluid is condensed. The bag includes a two-phase flow channel in which liquid-gas two-phase slug flow including the liquid-phase working fluid and the gas-phase working fluid occurs from the vaporizing portion to the condensing portion. The two-phase flow channel is provided in an internal space of the bag.

6 Claims, 5 Drawing Sheets

(51) Int. Cl.
*H01M 10/625* (2014.01)
*H01M 10/6552* (2014.01)
*H01M 10/6569* (2014.01)
*H01G 11/10* (2013.01)
*H01M 50/20* (2021.01)

(52) U.S. Cl.
CPC ..... *H01M 10/625* (2015.04); *H01M 10/6552* (2015.04); *H01M 10/6569* (2015.04); *H01M 50/20* (2021.01)

(58) Field of Classification Search
USPC .................................................... 165/104.19
See application file for complete search history.

(56) References Cited

U.S. PATENT DOCUMENTS

| | | | | |
|---|---|---|---|---|
| 6,397,935 | B1 | 6/2002 | Yamamoto et al. | |
| 6,725,910 | B2 * | 4/2004 | Ishida | F28D 15/046 165/104.21 |
| 2001/0047859 | A1 * | 12/2001 | Ishida | B21C 37/151 165/104.21 |
| 2011/0174464 | A1 * | 7/2011 | Liu | F28D 15/046 29/890.032 |
| 2012/0080170 | A1 * | 4/2012 | Yang | F28D 15/0283 29/890.032 |
| 2012/0325440 | A1 * | 12/2012 | Honmura | F28D 15/046 165/104.26 |
| 2019/0335619 | A1 * | 10/2019 | Tseng | H01L 23/427 |

FOREIGN PATENT DOCUMENTS

| | | | | |
|---|---|---|---|---|
| JP | 11-183069 | | 7/1999 | |
| JP | 11-204151 | | 7/1999 | |
| JP | 2001165584 A | * | 6/2001 | ......... F28D 15/0233 |
| JP | 2002372387 A | * | 12/2002 | ......... F28D 15/0233 |
| JP | 2003042674 A | * | 2/2003 | |
| JP | 2014-142143 | | 8/2014 | |
| JP | 2017-166748 | | 9/2017 | |
| JP | 2019039604 A | * | 3/2019 | |
| KR | 102158614 B1 | * | 7/2017 | |

OTHER PUBLICATIONS

International Preliminary Report on patentability issued in International Patent Application No. PCT/JP2018/042438, dated Apr. 8, 2020.

* cited by examiner

HEAT TRANSFER DEVICE AND ENERGY STORAGE MODULE

TECHNICAL FIELD

The technology described herein relates to a heat transfer device and an energy storage module including the heat transfer device.

BACKGROUND ART

An example of a heat transfer device including a working fluid enclosed in an airtight enclosure is disclosed in Patent Document 1. The heat transfer device includes a vapor retention portion and a condensation portion. A vaporized working fluid is retained in the vapor retention portion and condensed in the condensation portion.

The heat transfer device transfers heat on a principle of release of latent heat to the outside when the phase of the working fluid changes. This may occur when a working fluid is vaporized due to external heat applied to an airtight enclosure, the vaporized working fluid is directed to the vapor retention portion, and the vaporized working fluid that is cooled in the condensation portion from an outside is condensed on an inner wall of the airtight enclosure and back into a liquid phase.

RELATED ART DOCUMENT

Patent Document

[PATENT DOCUMENT 1]
Japanese Unexamined Patent Application Publication S63-148093

SUMMARY OF THE INVENTION

Problem to be Solved by the Invention

According to the configuration described above, the working fluid in a gas phase moves from a portion at a higher temperature to a portion at a lower temperature. The working fluid in a liquid phase moves from a portion at a lower temperature to a portion at a higher temperature. Namely, a move direction of the working fluid in the gas phase and a move direction of the working fluid in the liquid phase are opposite from each other.

According to the conventional technology, the working fluid may not smoothly move inside the airtight enclosure. If the working fluid cannot smoothly move inside the airtight enclosure, heat transfer efficiency of the heat transfer device decreases.

The technology described herein was made in view of the above circumstances. An object is to provide a technology regarding a heat transfer device with improved heat transfer efficiency.

Means for Solving the Problem

The technology described herein relates to a heat transfer device including a bag and a working fluid. The bag includes sheet with edges that are sealed together. The working fluid is enclosed in the bag and configured to change phase thereof between gas and liquid. The bag includes a vaporizing portion in which the working fluid in liquid phase is vaporized and a condensing portion in which the working fluid in gas phase is condensed. The bag includes a two-phase flow channel in which liquid-gas two-phase slug flow including the working fluid in the liquid phase and the working fluid in the gas phase occurs from the vaporizing portion to the condensing portion. The two-phase flow channel is provided in an internal space of the bag.

Heat from an outside of the bag to the vaporizing portion is transmitted to the working fluid in the liquid phase via the sheets. The working fluid in the liquid phase is vaporized due to the heat and an air bubble is created in the working fluid in the liquid phase. The working fluid in the liquid phase in which the air bubble is crated is converted into the working fluid in the gas phase. The working fluid in the liquid phase and the working fluid in the gas phase including the air bubble included in the liquid-gas two-phase slug flow move from the vaporizing portion to the condensing portion through the two-phase flow channel.

The working fluid in the gas phase in the condensing portion is condensed and converted into the working fluid in the liquid phase. When the phase changes from gas to liquid, latent heat is released. The latent heat is released to the outside of the bag via the sheets. The heat is transferred from the vaporizing portion to the condensing portion.

This configuration causes liquid-gas two-phase slug flow while the working fluid in the gas phase moves from the vaporizing portion to the condensing portion. In the slug flow, a pressure is applied to the working fluid in the liquid phase by the working fluid in the gas phase and thus the working fluid in the liquid phase moves from the vaporizing portion to the condensing portion. In the condensing portion, not only the working fluid in the liquid phase that are converted from the working fluid in the gas phase through condensation but also the working fluid in the liquid phase that have moved along with the working fluid in the gas phase through the two-phase flow channels exist. A pressure of the working fluid in the liquid phase in the condensing portion is higher in comparison to a configuration that does not include the two-phase flow channel. According to the configuration, a higher pressure can be applied to the working fluid in the liquid phase to move the working fluid in the liquid phase from the condensing portion to the vaporizing portion. The working fluid in the liquid phase can be pushed from the condensing portion to the vaporizing portion against the pressure of the working fluid in the gas phase. The working fluid in the liquid phase can smoothly move from the condensing portion to the vaporizing portion. According to the configuration, the heat transfer efficiency of the heat transfer device improves.

Following embodiments may be included in preferred embodiments of the technology described herein.

The bag may include a liquid-phase flow channel in which the working fluid in the liquid phase moves from the condensing portion to the vaporizing portion. The liquid phase flow channel may be provided in the internal space of the bag.

According to the configuration, the working fluid in the gas phase moves from the vaporizing portion to the condensing portion through the two-phase flow channel and the working fluid in the liquid phase moves from the condensing portion to the vaporizing portion through the liquid-phase flow channel. Therefore, the move of the working fluid in the liquid phase is less likely to be disturbed by the working fluid in the gas phase. Furthermore, the move of the working fluid in the gas phase is less likely to be disturbed by the working fluid in the liquid phase. The working fluid in the liquid phase and the working fluid in the gas phase smoothly move in the internal space of the bag. This improves heat transfer efficiency of the heat transfer device.

The liquid-phase flow channel may be located closer to an edge of the bag to extend from the vaporizing portion to the condensing portion.

At the edge of the bag and therearound, heat is released from the edge portion of the bag to the outside. A temperature at the edge of the bag and therearound is lower than a temperature at the middle of the bag. According to the configuration in which the liquid-phase flow channel is disposed close to the edge of the bag at which the temperature is relatively low, the working fluid is less likely to be vaporized and the working fluid is less likely to change the phase to the gas phase in the liquid-phase flow channel. Because the move of the working fluid in the liquid phase is less likely to be disturbed by the working fluid in the gas phase, the working fluid in the liquid phase can smoothly move. According to the configuration, the heat transfer efficiency of the heat transfer device improves.

The bag may include a divider disposed in the internal space of the bag. The bag and the divider may define a space therebetween. The space may include the two-phase flow channel extending from the vaporizing portion to the condensing portion.

According to the configuration, the two-phase flow channel can be provided inside the bag by disposing the divider inside the bag, which is a simple method.

The working fluid may have a volume such that a percentage of the volume relative to a spatial volume calculated by subtracting an internal volume of the bag from a volume occupied by the divider is equal to or greater than 50%.

According to the configuration, the liquid-gas two-phase slug flow including the working fluid in the gas phase and the working fluid in the liquid phase properly occurs in the two-phase flow channel.

The divider may include a nonwoven fabric including fibers having affinity for the working fluid in the liquid phase.

Because the working fluid in the liquid phase may have affinity for the fibers included in the divider, the working fluid in the liquid phase may permeate the divider because of capillary action. The working fluid in the liquid phase can move inside the divider because of the capillary action. Namely, the number of paths in which the liquid-phase working fluid moves from the condensing portion to the vaporizing portion increases. Therefore, a flow amount of the liquid-phase working fluid inside the bag increases. According to the configuration, the working fluid in the liquid phase can smoothly move and thus the heat transfer efficiency of the heat transfer device improves.

An energy storage module described herein includes the heat transfer device and an energy storage component that contacts the heat transfer device to be heat exchangeable.

According to the configuration, heat generated at the energy storage component can be efficiently transferred and transmitted to the energy storage component. Therefore, the heat transfer efficiency of the heat transfer device improves.

Advantageous Effect of the Invention

According to the technology described herein, heat transfer efficiency of a heat transfer device improves.

MODES FOR CARRYING OUT THE INVENTION

First Embodiment

Heat transfer devices 10 included in an energy storage module 11 according to a technology described herein will be described with reference to FIGS. 1 to 4. The energy storage module 11 may be installed in a vehicle such as an electric vehicle and a hybrid vehicle (not illustrated) and configured to supply power to a load such as a motor (not illustrated). Although the energy storage module 11 can be set in any position, the energy storage module 11 will be described with a sides pointed by an X arrow, a Y arrow, and Z arrow referred to as a left side, a front side, and an upper side, respectively. One of components having the same configuration may be indicated by a reference sign and others may not be indicated by the reference sign.

Energy Storage Module 11

Figure 1:
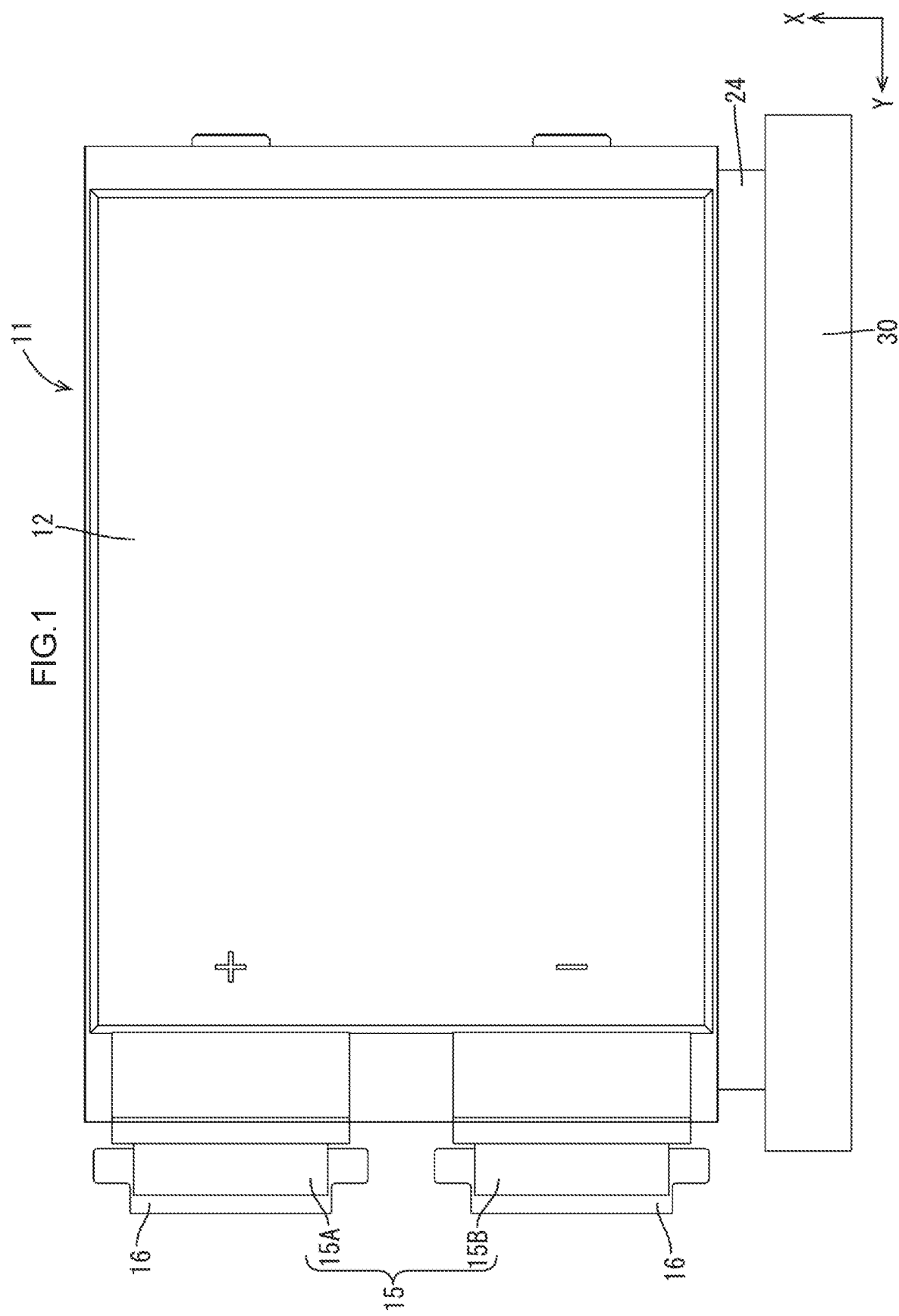
FIG. 1 is a plan view of an energy storage module according to a first embodiment.
Figure 2:
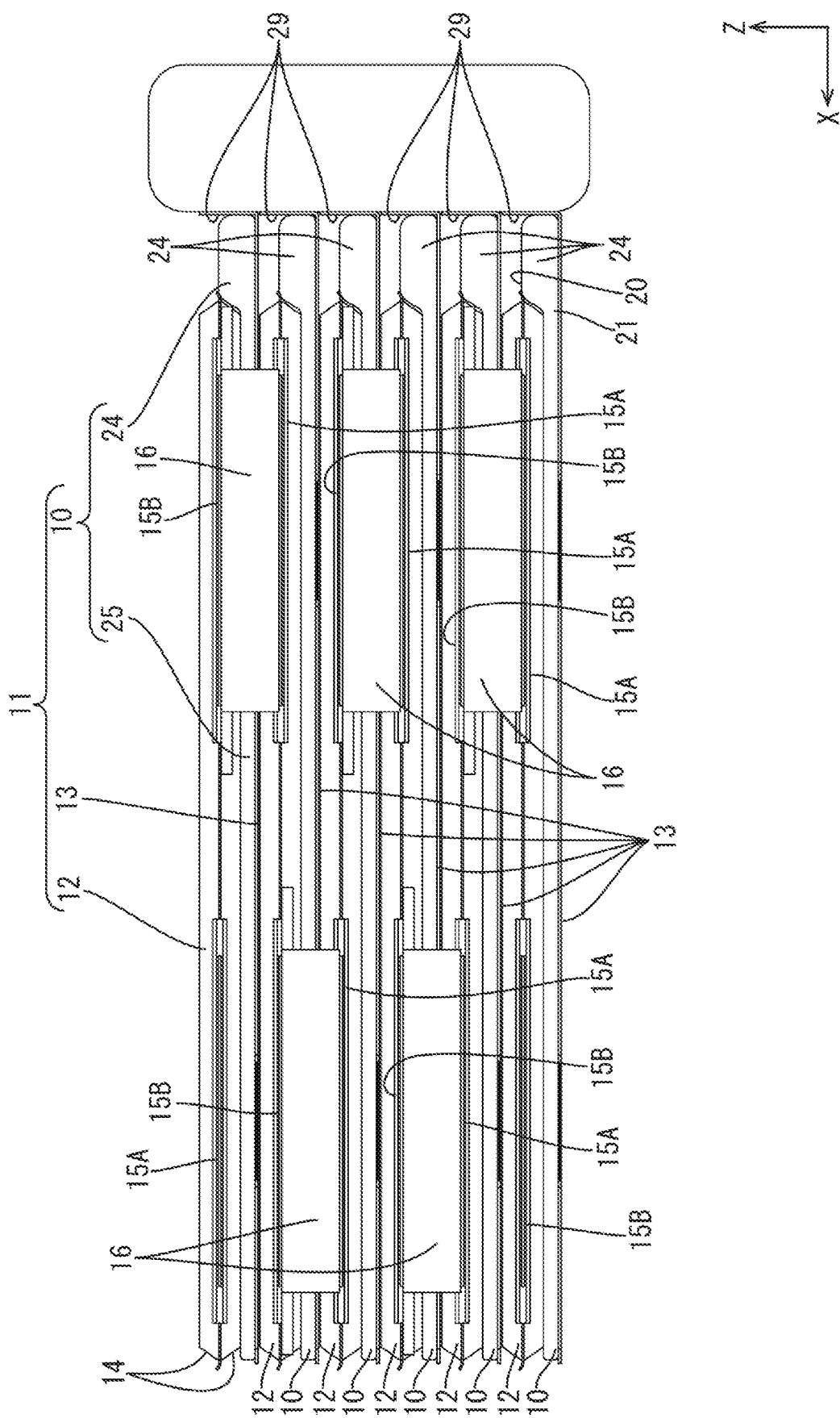
FIG. 2 is a front view of the energy storage module.

As illustrated in FIGS. 1 and 2, the energy storage module 11 includes multiple (six in this embodiment) energy storage components 12, multiple (six in this embodiment) heat transfer devices 10, multiple (six in this embodiment) heat exchanger plates 13. The heat transfer devices 10 are disposed over the energy storage components 12, respectively. The heat transfer devices 10 cool down the energy storage components 12. Each heat exchanger plate 13 is disposed between the corresponding heat transfer device 10 and the corresponding energy storage component 12 so that heat at the heat transfer device 10 and the energy storage component 12 are transmitted to the heat exchanger plate 13.

Energy Storage Component 12

Each energy storage component 12 is prepared by sandwiching an energy storage element, which is not illustrated, between two battery laminate sheets 14 and liquid-tightly sealing side edges of the battery laminate sheets using a known method such as thermoplastic welding. As illustrated in FIG. 1, a positive electrode 15A and a negative electrode 15B are liquid-tightly sealing with inner surfaces of the battery laminate sheets 14. The positive electrode 15A and the negative electrode 15B projecting from a front edge of the energy storage component 12 project from the inside of the battery laminate sheet 14 to the outside. The electrodes 15A and 15B at each energy storage component 12 are separated from each other in the right-left direction. Although not illustrated in detail, the electrodes 15A and 15B are electrically connected to the energy storage element. The positive electrodes 15A and the negative electrodes 15B may be referred to as the electrodes 15 to describe them without distinction.

As illustrated in FIG. 2, the energy storage components 12 are stacked in the top-bottom direction such that each electrode 15 is adjacent to another electrode 15. The adjacent electrodes 15 are electrically connected to each other via U-shaped connecting members 16 (five connecting members 16 in this embodiment). The electrodes 15 and the connecting members 16 are connected by a known method such as laser welding, ultrasonic welding, and brazing. By connecting the adjacent electrodes 15 via the connecting members 16, the energy storage components 12 are connected in series.

In this embodiment, secondary batteries such as lithium-ion secondary batteries and nickel-metal hydride secondary batteries may be used for the energy storage components 12. Alternatively, capacitors such as electric double layer capacitors and lithium-ion capacitors may be used. Any types of energy storage components may be used where appropriate.

Heat Transfer Device 10

Figure 4:
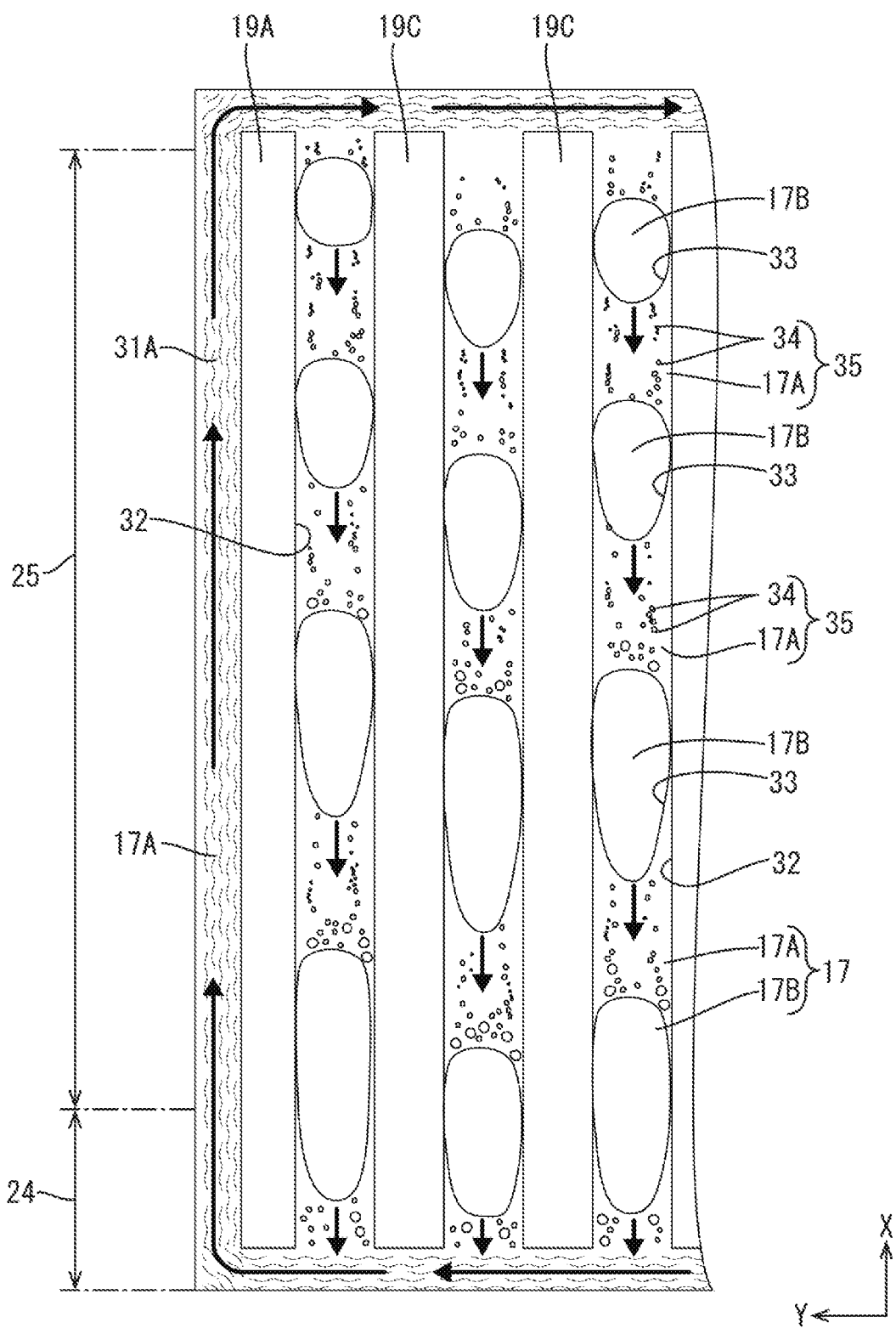
FIG. 4 is a schematic view illustrating slug flow conditions inside a bag.

As illustrated in FIG. 4, the heat transfer devices 10 include working fluids 17, bags 18, and dividers 19. The working fluids 17 change phase thereof between liquid and gas. The bags 18 enclose the working fluids 17, respectively. The dividers 19 are disposed in the bags 18.

Working Fluid 17

The working fluids 17 may change the phase between liquid and gas. The working fluids 17 in the liquid phase may be referred to as liquid-phase working fluids 17A and the working fluids 17 in the gas phase may be referred to as gas-phase working fluids 17B. The liquid-phase working fluids 17A and the gas-phase working fluids 17B may be referred to as the working fluids 17 when they are described without distinction. The working fluids 17 may be selected from one of or some of perfluorocarbon, perfluoroketone, hydrofluoroether, hydrofluoroketone, fluorine inert fluid, water, and alcohol. The alcohol may be methanol or ethanol. The working fluids 17 may have insulating properties or conductivity.

Bag 18

Each bag 18 may be prepared by placing a first sheet 20 (a sheet) and a second sheet 21 (a sheet) on top of each other and liquid-tightly bonding (joining) together using a known method such as gluing and welding. The first sheet 20 and the second sheet 21 have rectangular shapes. Each of the first sheet 20 and the second sheet 21 is prepared by stacking an outer surface film (not precisely illustrated) made of resin on an outer surface of a metal sheet (not precisely illustrated) and an inner surface film (not precisely illustrated) made of resin on an inner surface of the metal sheet. The metal sheet is laminated with the outer surface film and the inner surface film using a known method such as gluing and thermal bonding. A metal for the metal sheet may be selected from any metals including aluminum, aluminum alloy, copper, and copper alloy where appropriate. A synthetic resin for the inner surface film may be selected from any synthetic resins including polyolefin such as polyethylene and polypropylene, polyester such as polybutylene terephthalate and polyethylene terephthalate, and polyamide such as nylon 6 and nylon 6,6. The bag 18 in this embodiment is prepared by aligning surfaces of the first sheet 20 and the second sheet 21 on which the inner surface films made of synthetic resin are superposed and bonding them together by thermal bonding.

The bag 18 includes the first sheet 20 that covers the dividers 19 from above and the second sheet 21 that covers the dividers 19 from below. An upper surface of the first sheet 20 contacts a lower surface of the energy storage component 12. A lower surface of the second sheet 21 contacts an upper surface of the exchanger plate 13.

As illustrated in FIG. 2, a portion of each heat transfer device 10 including a section of the first sheet 20 in a space in which the energy storage component 12 is not disposed is defined as the condensing portion 24 in which the gas-phase working fluid 17B created when the working fluid 17 is vaporized in the bag 18 may be condensed. The portion of the heat transfer device 10 projecting rightward from the energy storage component 12 when viewed from above is defined as the condensing portion 24.

The condensing portion 24 is inflatable when the working fluid 17 is vaporized in the bag 18 and an internal pressure of the bag 18 is increased. This is because the condensing portion 24 is projected rightward from the energy storage component 12 when viewed from above, as described earlier.

A portion of the heat transfer device 10 other than the condensing portion 24 (more to the left than the condensing portion 24) is sandwiched between the energy storage component 12 and the heat exchanger plate 13, which will be described later. The portion contacts the energy storage component 12 and the heat exchanger plate 13 and thus the portion is less likely to inflate even when the working fluid 17 is vaporized in the bag 18 and the internal pressure of the bag 18 is increased. The portion of the heat transfer device 10 contacting the energy storage component 12 is defined as a vaporizing portion 25 in which the working fluid 17 is vaporized in the bag 18 due to the heat transmitted from the energy storage component 12, that is, the working fluid 17 changes the phase from liquid to gas.

Divider 19

Figure 3:
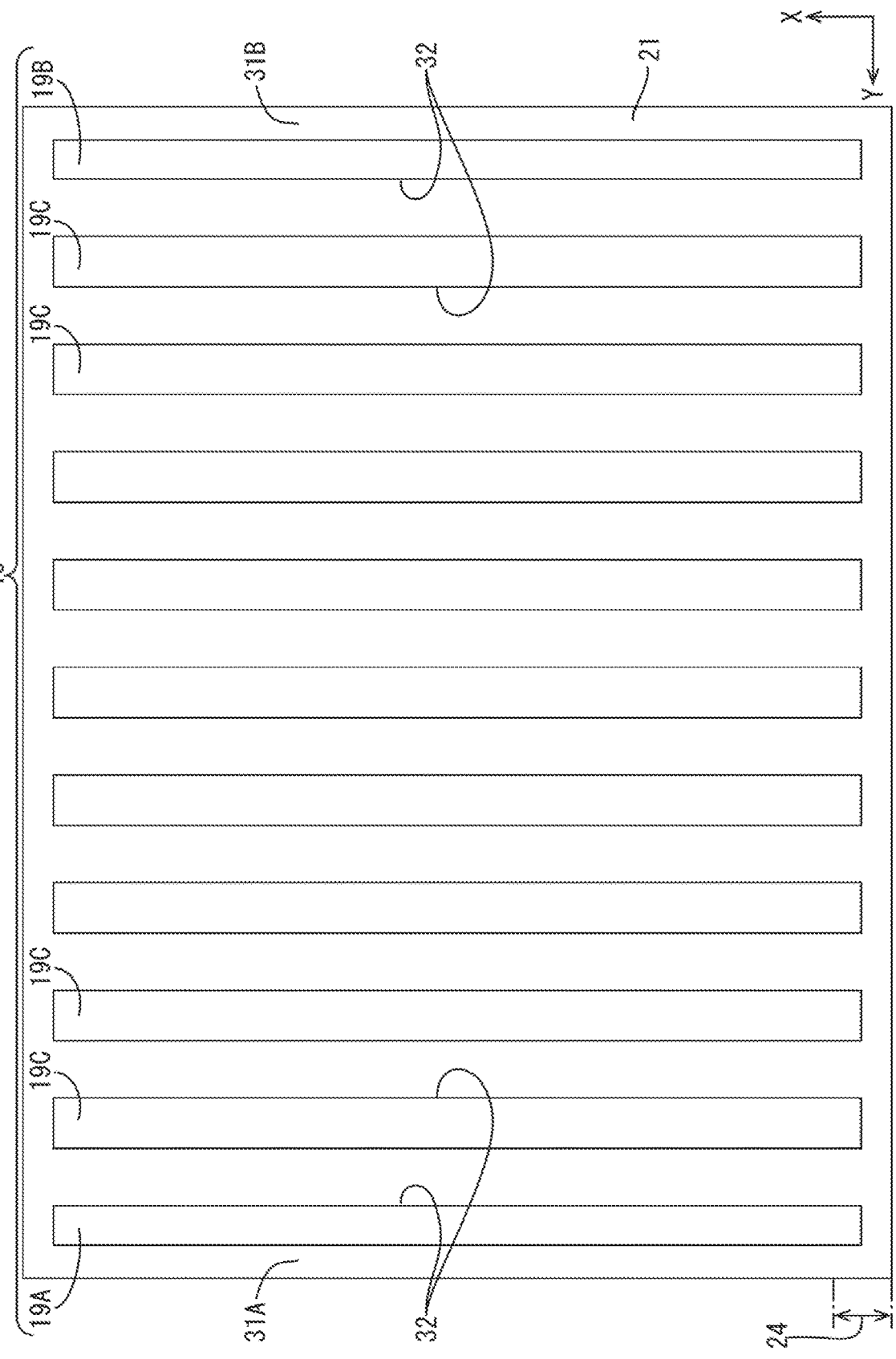
FIG. 3 is a plan view of a heat transfer device without a first sheet.

As illustrated in FIG. 3, each of the dividers 19 has a rectangular bar shape that extends in the right-left direction. In this embodiment, eleven dividers 19 are arranged at intervals in the front-rear direction on the upper surface of the second sheet 21. The dividers 19 may be fixed to the upper surface of the second sheet 21 using a known method such as gluing and thermal bonding.

The dividers 19 may be made of metal, synthetic resin, or any material that is selected where appropriate. The metal for the dividers 19 may be selected from any materials including copper, copper alloy, aluminum, aluminum alloy, and stainless steel where appropriate.

The synthetic resin for the dividers 19 may be selected from any resins including polyolefin such as polyethylene and polypropylene, polyester such as polybutylene terephthalate and polyethylene terephthalate, polyamide such as nylon 6 and nylon 6,6, and fluororesin such as polytetrafluoroethylene where appropriate.

Each divider 19 may have a solid structure or a fibrous structure including fibers and pores such as a woven fabric and a nonwoven fabric. The nonwoven fabric may be in the form of a fabric sheet, a web (a thin film consists of only fibers), or a batt (fibers put together into the form of blanket). The fibers for the woven fabric and the nonwoven fabric may be natural fibers, synthetic fibers made of synthetic resin, or combination of the natural fibers and the synthetic fibers. Synthetic resin for the woven fabric and the nonwoven fabric may have affinity for the liquid-phase working fluid 17A or liquid-repellent properties for the liquid-phase working fluid 17A. The dividers 19 in this embodiment are prepared from a nonwoven fabric consisting synthetic fibers having affinity for the liquid-phase working fluid 17A.

A dimension of each divider 19 in the right-left direction is smaller than dimensions of the first sheet 20 and the second sheet 21 in the right-left direction. Therefore, a space is provided between the left end of the divider 19 and the left edges of the first sheet 20 and the second sheet 21. Similarly, a space is provided between the right end of the divider 19 and the right edges of the first sheet 20 and the second sheet 21.

Heat Exchanger Plate 13

Each heat exchanger plate 13 has a rectangular shape. As illustrated in FIG. 2, each heat exchanger plate 13 is placed over the corresponding energy storage component 12 with the corresponding heat transfer device 10 sandwiched between the heat exchanger plate 13 and the corresponding energy storage component 12. The heat exchanger plates 13 are made of a material having high thermal conductivity such as aluminum, aluminum alloy, copper, and copper alloy. In this embodiment, aluminum or aluminum alloy is used. Each heat exchanger plate 13 having a flat plate shape is disposed in an area in which the corresponding energy storage component 12 is disposed to contact the energy storage component 12 and the second sheet 21. The heat exchanger plate 13 receives heat from the energy storage component 12. The heat exchanger plates 13 include separating walls 29, respectively. The separating walls 29 are located at the right ends of the heat exchanger plates 13 and bent at right angle to plate surfaces of the heat exchanger plates 13. Outer surfaces (right surfaces) of the separating walls 29 contact a left surface of a heatsink. According to the configuration, the heat from each energy storage component 12 is transmitted to the heat exchanger plates 13 disposed above and under the energy storage component 12 via the condensing portions 24 of the heat transfer devices 10 and then released through a jacket 30, which will be described later, to the outside.

Jacket 30

As illustrated in FIGS. 1 and 2, the jacket 30 is disposed on the right of the energy storage module 11. The jacket 30 contacts the heat exchanger plates 13 to be heat-exchangeable. According to the configuration, the heat is transmitted between the jacket 30 and the heat exchanger plates 13. If temperatures of the heat exchanger plates 13 are higher than a temperature of the jacket 30, the heat is transmitted from the heat exchanger plates 13 to the jacket 30. If the temperatures of the heat exchanger plates 13 are lower than the temperature of the jacket 30, the heat is transmitted from the jacket 30 to the heat exchanger plates 13. The left surface of the jacket 30 (a surface on an energy storage module 11 side) tightly contacts outer surfaces of the separating walls 29 of the heat exchanger plates 13. The jacket 30 may be made of metal such as aluminum and aluminum alloy. The jacket 30 includes an inlet and an outlet for a heating medium, which are not illustrated. The heating medium enters through the inlet located on a lower side and exits through the outlet located on an upper side. The heating medium circulates through a circulation channel, which is not illustrated. The heat that is transmitted to the heating medium moves in the circulation channel as the heating medium moves.

The jacket 30 may include a pipe through which the heating medium passes (not illustrated). The pipe may turn several times and extend to cover an entire internal space of the jacket 30. In this embodiment, water is used for the heating medium. Other type of liquid such as oil may be used for the heating medium. Alternatively, antifreeze liquid may be used for the heating medium. The heating medium is not limited to liquid. Gas may be used for the heating medium.

Liquid-Phase Flow Channel 31

An internal space of each bag 18 includes a section closer to the front edge and a section closer to the rear edge defined as liquid-phase flow channels 31. The liquid-phase working fluid 17A flows from the condensing portion 24 toward the vaporizing portion 25.

The liquid-phase flow channel 31 on the front side is defined as the front liquid-phase flow channel 31A. The front liquid-phase flow channel 31A extends in the right-left direction from the condensing portion 24 to the vaporizing portion 25 in a region of the bag 18 between an inner surface of a front section of the bag 18 and the front divider 19A located on the front side. The liquid-phase flow channel 31 on the rear side is defined as the rear liquid-phase flow channel 31B. The rear liquid-phase flow channel 31B extends in the right-left direction from the condensing portion 24 to the vaporizing portion 25 in a region of the bag 18 between an inner surface of a rear section of the bag 18 and the rear divider 19B located on the rear side.

The front divider 19A located on the front side and the rear divider 19B located on the rear side have widths, which measure in the front-rear direction, smaller than the widths of other dividers 19C. The front divider 19A, the rear divider 19B, and other dividers 19C may be referred to as the dividers 19 to describe them without distinction.

Two-Phase Channel 32

Each bag 18 includes two-phase flow channels 32 (ten channels in this embodiment) extending in the right-left direction from the vaporizing portion 25 to the condensing portion 24. The two-phase flow channels 32 are arranged at intervals in the front-rear direction. Liquid-gas two-phase slug flow that includes the liquid-phase working fluids 17A and the gas-phase working fluids 17B (in the gas phase) occurs in the two-phase flow channels 32. In this embodiment, the slug flow refers flow of air bubbles 33 and liquid slugs 35 that alternately appear in a length direction of the two-phase flow channels 32 (in the right-left direction). The air bubbles 33 included in the gas-phase working fluids 17B are relatively large bubbles. The liquid slugs 35 include the liquid-phase working fluids 17A and relatively small air bubbles 34 dispersed in the liquid-phase working fluids 17A.

The two-phase flow channels 32 are defined by the divides 19 and the inner surfaces of the bag 18. The two-phase flow channels 32 extend in the right-left direction from an upper edge of the vaporizing portion 25 to the condensing portion 24.

In this embodiment, a percentage of a volume of the liquid-phase working fluids 17A relative to a spatial volume calculated by subtracting an internal volume of the bag 18 from a volume occupied by the dividers 19 is equal to or greater than 50%. The volume occupied by the dividers 19 is defined based on an assumption that the dividers 19 are solid. If the dividers 19 are prepared from nonwoven fabric, a volume of micro pores is not included. If the percentage is less than 50%, the slug flow is less likely to occur in the two-phase flow channels 32. Therefore, the percentage of less than 50% is not preferable.

Next, functions and effects of this embodiment will be described. The heat transfer devices 10 according to this embodiment include the bags 18 and the working fluids 17. Each bag 18 includes the first sheet 20 and the second sheet 21 with the edges thereof tightly sealed together. The working fluids 17 are enclosed in the bags 18. The working fluids 17 change the phase between gas and liquid. The bags 18 include the vaporizing portions 25 and the condensing portions 24. The liquid-phase working fluids 17A are vaporized in the vaporizing portions 25. The gas-phase working fluids 17B are condensed in the condensing portions 24. The bags 18 include the two-phase flow channels 32 in which the liquid-gas two-phase slug flow including the liquid-phase working fluids 17A and the gas-phase working fluids 17B occurs from the vaporizing portions 25 to the condensing portions 24.

The heat from the outside of each bag 18 is transmitted to the liquid-phase working fluids 17A via the first sheet 20 and the second sheet 21. The liquid-phase working fluids 17A are vaporized due to the heat and the air bubbles 33 are created in the liquid-phase working fluids 17A. Namely, the liquid-phase working fluids 17A in which the air bubbles 33 are created are converted into the gas-phase working fluids 17B. As illustrated in FIG. 4, the liquid-gas phase slug flow that includes the liquid-phase working fluids 17A and the gas-phase working fluids 17B including the air bubbles 33 occurs from the vaporizing portion 25 to the condensing portion 24 via the two-phase flow channels 32.

The gas-phase working fluids 17B have moved to the condensing portions 24 are condensed in the condensing portions 24 and converted to the liquid-phase working fluids 17A. During the phase change from gas to liquid, latent heat is released. The latent heat is released to the outside the bags 18 via the first sheets 20 and the second sheets 21. The heat is transferred from the vaporizing portions 25 to the condensing portions 24 and the heat is released to the outside the bags 18.

This configuration causes the liquid-gas phase slug flow that includes not only the gas-phase working fluids 17B but also the liquid-phase working fluids 17A while the gas-phase working fluids 17B move from the vaporizing portion 25 to the condensing portion 24. Pressures are applied to the liquid-phase working fluids 17A by the gas-phase working fluids 17B and thus the liquid-phase working fluids 17A move from the vaporizing portion 25 to the condensing portion 24. In the condensing portion 24, not only the liquid-phase working fluids 17A that are converted from the gas-phase working fluids 17B through condensation but also the liquid-phase working fluids 17A that have moved along with the gas-phase working fluids 17B through the two-phase flow channels 32 exist. A pressure of the liquid-phase working fluids 17A in the condensing portion 24 is higher in comparison to a configuration that does not include the two-phase flow channels 32. According to the configuration, a higher pressure can be applied to the liquid-phase working fluids 17A to move the liquid-phase working fluids 17A from the condensing portion 24 to the vaporizing portion 25. The liquid-phase working fluids 17A can be pushed from the condensing portion 24 to the vaporizing portion 25 against the pressure of the gas-phase working fluids 17B. The liquid-phase working fluids 17A can smoothly move from the condensing portion 24 to the vaporizing portion 25. According to the configuration, the heat transfer efficiency of the heat transfer devices 10 improves.

In this embodiment, the bags 18 include the liquid-phase flow channels 31 through which the liquid-phase working fluids 17A move from the condensing portions 24 to the vaporizing portions 25.

In this embodiment, the gas-phase working fluids 17B move from the vaporizing portions 25 to the condensing portions 24 via the two-phase flow channels 32. The liquid-phase working fluids 17A move from the condensing portions 24 to the vaporizing portions 25 via the two-phase flow channels 32. The move of the liquid-phase working fluids 17A is less likely to be disturbed by the gas-phase working fluids 17B. The move of the gas-phase working fluids 17B is less likely to be disturbed by the liquid-phase working fluids 17A. Therefore, the liquid-phase working fluids 17A and the gas-phase working fluids 17B can smoothly move inside the bags 18 and thus the heat transfer efficiency of the heat transfer devices 10 improves.

In this embodiment, the liquid-phase flow channels 31 are located closer to the edges of the bags 18 to extend from upper edges of the vaporizing portions 25 to the condensing portions 24.

The heat is release to the outside of the bags 18 at the edges of the bags 18. Therefore, temperatures at the edges of the bags 18 are lower than temperatures at the middle of the bags 18. By providing the liquid-phase flow channels 31 closer to the edges of the bags 18 at which the temperatures are lower, the liquid-phase working fluids 17A are less likely to be vaporized and converted to the gas-phase working fluids 17B in the liquid-phase flow channels 31 (see FIG. 4). Because the move of the liquid-phase working fluids 17A is less likely to be disturbed by the gas-phase working fluids 17B, the liquid-phase working fluids 17A can smoothly move. According to the configuration, the heat transfer efficiency of the heat transfer devices 10 improves.

In this embodiment, the dividers 19 are disposed inside each bag 18 and spaces between the adjacent dividers 19 are defined as the two-phase flow channels 32 that extend from an upper edge of the vaporizing portion 25 to the condensing portion 24.

According to the configuration, the two-phase flow channels 32 can be formed inside the bags 18 by a simple method, that is, simply disposing the dividers in the bags 18.

In this embodiment, the percentage of the volume of the liquid-phase working fluids 17A relative to the spatial volume calculated by subtracting the internal volume of the bag 18 from the volume occupied by the dividers 19 is equal to or greater than 50%.

According to the configuration, the liquid-gas phase slug flow that includes the liquid-phase working fluids 17A and the gas-phase working fluids 17B properly occurs in the two-phase flow channels 32. Therefore, the heat transfer efficiency of the heat transfer devices certainly improves.

In this embodiment, the dividers 19 are prepared from the nonwoven fabric including fibers having affinity for the liquid-phase working fluid 17A.

Because the liquid-phase working fluids 17A have affinity for the fibers included in the dividers 19, the liquid-phase working fluids 17A permeate the dividers 19 because of the capillary action. The liquid-phase working fluids 17A can move inside the dividers 19 because of the capillary action. Namely, the number of paths in which the liquid-phase working fluids 17A move from the condensing portions 24 to the vaporizing portions 25 increases. Therefore, a flow amount of the liquid-phase working fluids 17A inside the bags 18 increases. According to the configuration, the liquid-phase working fluids 17A can smoothly move and thus the heat transfer efficiency of the heat transfer devices 10 improves.

In this embodiment, the energy storage module 11 includes the heat transfer devices 10 and the energy storage components 12 that contact the heat transfer devices 10 to be heat-exchangeable. According to the configuration, the heat generated at the energy storage components 12 can be efficiently transferred and efficiently transmitted to the energy storage components 12 by the heat transfer devices 10. Therefore, the performance of the energy storage module 11 improves.

Second Embodiment

Figure 5:
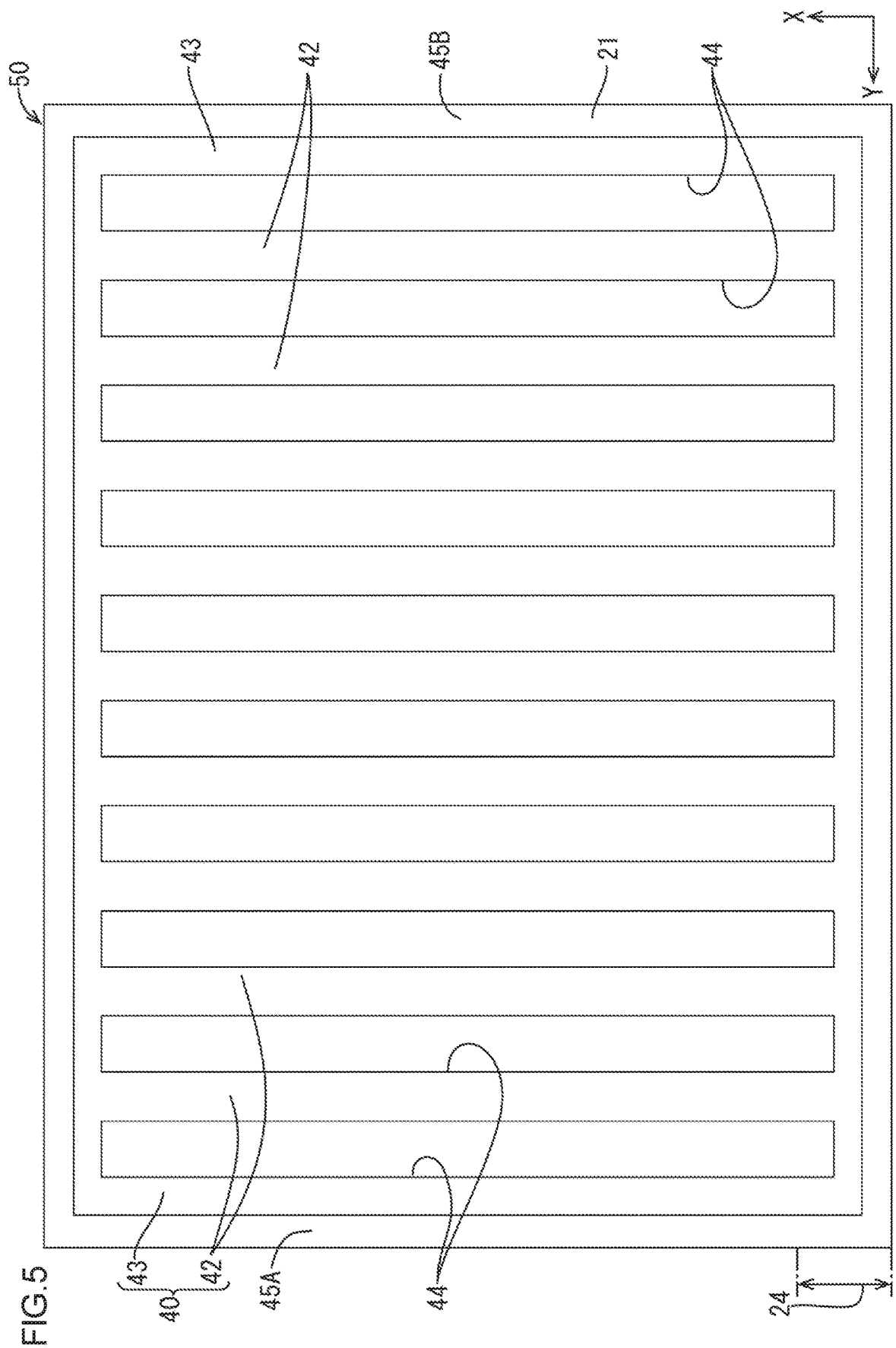
FIG. 5 is a plan view of a heat transfer device without a first sheet according to a second embodiment.

A second embodiment of the technology described herein will be described with reference to FIG. 5. Dividers 40 disposed in heat transfer devices 50 have a rectangular shape when viewed from above. Each divider 40 has dimensions smaller than outer dimensions of each bag 18. The dividers 40 are disposed inside the bags 18. The dividers 40 may or may not be fixed to inner surfaces of the bags 18. In this embodiment, the dividers 40 are not fixed to the inner surfaces of the bags 18.

Each divider 40 includes a frame portion 43 having a frame shape and beam portions 42 (nine beam portions in this embodiment) connecting an upper section to a lower section of the frame portion 43. Spaces between the beam portions 42 are defined as two-phase flow channels 44 that extend in the right-left direction (ten flow channels 44 in this embodiment). The two-phase flow channels 44 are drilled through the dividers 40 in the top-bottom direction. In this embodiment, the two-phase flow channels 44 are arranged at equal intervals. The intervals between the two-phase flow channels 44 may not be equal to each other. The cross section of each beam portion 42 has a rectangular shape.

Each two-phase flow channel 44 extends from a position close to the left edge of the divider 40 to a position close to the right edge of the divider 40. The left edge of each two-phase flow channel 44 is located in an area corresponding to the condensing portion 24. According to the configuration, the gas-phase working fluids 17B is condensed at the left edges of the two-phase flow channels 44 and the phase changes, that is, liquids are produced.

In sections of the two-phase flow channels 44 located at positions corresponding to the vaporizing portion 25 inside each bag 18, the liquid-phase working fluids 17A are vaporized due to heat transmitted from the energy storage components 12 and converted into the gas-phase working fluids 17B.

The liquid-phase flow channels 45 through which the liquid-phase working fluids 17A move from the condensing portions 24 to the vaporizing portions 25 are located in a section of the internal space of each bag 18 close to the front edge and a section of the internal space close to the rear edge.

The liquid-phase flow channel 45 on the front side is defined as a front liquid-phase flow channel 45A. The front liquid-phase flow channel 45A is provided in an area between the inner surface of the front section of the bag 18 and the front surface of the divider 40. The front liquid-phase flow channel 45A extends in the right-left direction from the condensing portion 24 to the vaporizing portion 25. The liquid-phase flow channel 45 on the rear side is defined as a rear liquid-phase flow channel 45B. The rear liquid-phase flow channel 45B is provided in an area between the inner surface of the rear section of the bag 18 and the rear surface of the divider 40. The rear liquid-phase flow channel 45B extends in the right-left direction from the condensing portion 24 to the vaporizing portion 25.

Other configurations are similar to the configurations of the first embodiment. The same components are indicated by the same reference signs and will not be repeatedly described.

In this embodiment, the dividers 40 are not fixed to the inner surfaces of the bags 18. Therefore, a production process of the heat transfer devices 50 can be simplified.

Other Embodiments

The technology described herein is not limited to the embodiments described above and illustrated in the drawings. For example, the following embodiments will be included in the technical scope of the technology described herein.

(1) Each two-phase flow channel 32 or 44 may not extend from the upper edge of the vaporizing portion 25 to the condensing portion 24 as long as the two-phase flow channel 32 or 44 extends from the upper edge of the vaporizing portion 25 toward the condensing portion 24. Only one two-phase flow channel 32 or 44 may be provided or multiple two-phase flow channels 32 or 44 may be provided.

(2) Each liquid-phase flow channel 31 may extend from the condensing portion 24 to the vaporizing portion 25 as long as the liquid-phase flow channel 31 extends from the vaporizing portion 25 toward the condensing portion 24. Only one liquid-phase flow channel 31 may be provided or multiple liquid-phase flow channels 31 may be provided.

(3) The liquid-phase flow channels 31 may not be located closer to the edges of the bags 18.

(4) The two-phase flow channels 32 and/or 44 and/or the liquid-phase flow channels 31 may be defined by protrusions or recesses that may be formed on or in the inner surfaces of the bags 18. In such a configuration, the dividers 19 or 40 may be omitted.

(5) The percentage of the volume of the liquid-phase working fluids 17A relative to the spatial volume calculated by subtracting the internal volume of the bag 18 from the volume occupied by the dividers 19 or 40 may be less than 50%.

(6) Each divider 19 may have any shape where appropriate.

(7) The application of the heat transfer devices 10 or 50 is not limited to the energy storage components 12. The heat transfer devices 10 or 50 may be applied to devices including electric junction boxes, DC-DC converters, and ECUs.

EXPLANATION OF SYMBOLS 10, 50: Heat transfer device
11: Energy storage module
12: Energy storage component
17: Working fluid
17A: Liquid-phase working fluid
17B: Gas-phase working fluid
18: Bag
19, 40: Divider
20: First sheet
21: Second sheet
24: Condensing portion
25: Vaporizing portion
31, 45: Liquid-phase flow channel
31A, 45A: Front liquid-phase flow channel
31B, 45B: Rear liquid-phase flow channel
32, 44: Two-phase flow channel

The invention claimed is:

1. A heat transfer device comprising:
a bag including sheets with edges sealed together; and
a working fluid enclosed in the bag and configured to change phase thereof between gas and liquid, wherein
the bag includes a vaporizing portion in which the working fluid in liquid phase is vaporized and a condensing portion in which the working fluid in gas phase is condensed,
the bag includes a two-phase flow channel in which liquid-gas two-phase slug flow including the working fluid in the liquid phase and the working fluid in the gas phase occurs from the vaporizing portion to the condensing portion, the two-phase flow channel being provided in an internal space of the bag,
the bag includes a divider disposed in the internal space of the bag,
the bag and the divider define a space therebetween,
the space includes the two-phase flow channel extending from the vaporizing portion to the condensing portion,
the working fluid has a volume such that a percentage of the volume relative to a spatial volume calculated by subtracting an internal volume of the bag from a volume of the divider is equal to or greater than 50%, the divider includes a nonwoven fabric, and the volume of the divider is defined based on an assumption that the divider is solid.

2. The heat transfer device according to claim 1, wherein the bag includes a liquid-phase flow channel in which the working fluid in the liquid phase moves from the condensing portion to the vaporizing portion, and the liquid phase flow channel is provided in the internal space of the bag.

3. The heat transfer device according to claim 2, wherein the liquid-phase flow channel is located closer to an edge of the bag to extend from the vaporizing portion to the condensing portion.

4. The heat transfer device according to claim 1, wherein the divider includes fibers having affinity for the working fluid in the liquid phase.

5. An energy storage module comprising:

the heat transfer device according to claim 1; and an energy storage component contacting the heat transfer device to be heat-exchangeable.

6. The heat transfer device according to claim 1, wherein the volume of the working fluid is a volume of the working fluid in the liquid phase.

\* \* \* \* \*